(12) United States Patent
Agasi et al.

(10) Patent No.: US 11,694,293 B2
(45) Date of Patent: Jul. 4, 2023

(54) TECHNIQUES FOR GENERATING ANALYTICS BASED ON INTERACTIONS THROUGH DIGITAL CHANNELS

(71) Applicant: CONTENT SQUARE ISRAEL LTD., Ramat Gan (IL)

(72) Inventors: Shira Agasi, Ra'anana (IL); Ori Reshef, Tel Aviv (IL)

(73) Assignee: CONTENT SQUARE ISRAEL LTD, Ramat Gan (IL)

( * ) Notice: Subject to any disclaimer, the term of this patent is extended or adjusted under 35 U.S.C. 154(b) by 517 days.

(21) Appl. No.: 16/023,928

(22) Filed: Jun. 29, 2018

(65) Prior Publication Data

US 2020/0005417 A1    Jan. 2, 2020

(51) Int. Cl.
*G06Q 50/26* (2012.01)
*G06F 40/174* (2020.01)

(52) U.S. Cl.
CPC ......... *G06Q 50/265* (2013.01); *G06F 40/174* (2020.01)

(58) Field of Classification Search
CPC combination set(s) only.
See application file for complete search history.

(56) References Cited

U.S. PATENT DOCUMENTS

| | | | |
|---|---|---|---|
| 6,966,029 B1 | 11/2005 | Ahern | |
| 7,523,191 B1 * | 4/2009 | Thomas | G06F 11/3438 709/202 |
| 7,941,525 B1 * | 5/2011 | Yavilevich | H04L 67/02 709/224 |
| 8,578,010 B2 * | 11/2013 | Branson | H04L 67/22 709/223 |
| 9,766,769 B1 * | 9/2017 | Webber | G06F 11/3668 |
| 2007/0239604 A1 * | 10/2007 | O'Connell | G06Q 20/4016 705/50 |
| 2007/0299631 A1 * | 12/2007 | Macbeth | G06Q 10/10 702/187 |

(Continued)

FOREIGN PATENT DOCUMENTS

| | | |
|---|---|---|
| CN | 112334899 | 2/2021 |
| WO | 2020005349 | 1/2020 |

OTHER PUBLICATIONS

Christiane Lehrer, Alexander Wieneke, Jan vom Brocke, Reinhard Jung & Stefan Seidel (2018) How Big Data Analytics Enables Service Innovation: Materiality, Affordance, and the Individualization of Service, Journal of Management Information Systems, 35:2, 424-460, DOI: 10.1080/07421222.2018.1451953.*

(Continued)

*Primary Examiner* — Peter Ludwig
*Assistant Examiner* — Donald J Edmonds
(74) *Attorney, Agent, or Firm* — Schwegman Lundberg & Woessner, P.A.

(57) ABSTRACT

A system and method for generating analytics based on interactions through digital channels. The method includes determining a plurality of interaction sensor signals based on interactions with an electronic form (e-form); clustering at least one set of similar interaction sensor signals of the determined plurality of interaction sensor signals, wherein each set of similar interaction sensor signals includes signals determined based on interactions with the same portion of the e-form; and generating at least one analytic based on each clustered set of interaction sensor signals.

17 Claims, 5 Drawing Sheets

(56) References Cited

U.S. PATENT DOCUMENTS

| | | | | |
|---|---|---|---|---|
| 2013/0132833 A1* | 5/2013 | White | .................. | G06F 11/3438 |
| | | | | 715/704 |
| 2013/0197998 A1* | 8/2013 | Buhrmann | ......... | G06Q 20/4016 |
| | | | | 705/14.53 |
| 2013/0304906 A1* | 11/2013 | Yavilevich | ............. | H04L 67/22 |
| | | | | 709/224 |
| 2014/0181530 A1* | 6/2014 | Kononov | ............ | G06F 16/122 |
| | | | | 726/22 |
| 2015/0269380 A1* | 9/2015 | Golovanov | ........... | G06F 21/562 |
| | | | | 726/24 |
| 2016/0080936 A1* | 3/2016 | Rachuri | ................ | H04W 12/33 |
| | | | | 726/7 |
| 2016/0110280 A1* | 4/2016 | Singh | .................. | G06F 3/04842 |
| | | | | 715/762 |
| 2016/0247158 A1* | 8/2016 | Kolotinsky | ......... | G06Q 20/4016 |
| 2016/0314110 A1* | 10/2016 | Corcoran | ............. | G06F 40/174 |
| 2017/0078419 A1* | 3/2017 | Yavilevich | ............. | G06Q 30/02 |
| 2017/0228355 A1* | 8/2017 | Ling, III | ............ | G06K 9/00449 |
| 2017/0309047 A1* | 10/2017 | Demiralp | ............. | G06F 16/958 |
| 2018/0012003 A1* | 1/2018 | Asulin | .................... | G06F 21/36 |
| 2018/0033010 A1* | 2/2018 | Ustinov | ................. | G06Q 40/02 |
| 2018/0034884 A1* | 2/2018 | Niuwenhuys | ......... | H04L 65/607 |
| 2018/0089159 A1* | 3/2018 | Jain | ...................... | G06F 40/186 |
| 2018/0089412 A1* | 3/2018 | Kopikare | .............. | G06F 40/174 |
| 2018/0108015 A1* | 4/2018 | Rogas | ................. | H04L 61/1511 |
| 2018/0174288 A1* | 6/2018 | Kogan | ............... | G06K 9/00604 |

OTHER PUBLICATIONS

International Search Report and Written Opinion of International Searching Authority for PCT/US2019/023401, ISA/RU, Moscow, Russia, dated Jul. 2, 2019.
Formisimo Website, internet link: https://www.formisimo.com, Formisimo Ltd., England, 2015.
"European Application Serial No. 19826519.1, Extended European Search Report dated Jun. 30, 2021", 6 pages.
"International Application Serial No. PCT US2019 023401, International Search Report dated Jul. 11, 2019", 2 pages.
"International Application Serial No. PCT US2019 023401, Written Opinion dated Jul. 11, 2019", 4 pages.
"International Application Serial No. PCT US2019 023401, International Preliminary Report on Patentability dated Jan. 7, 2021", 6 pages.
"European Application Serial No. 19826519.1, Response Filed Jan. 25, 2022 to Extended European Search Report dated Jun. 30, 2021", 10 pages.

* cited by examiner

TECHNIQUES FOR GENERATING ANALYTICS BASED ON INTERACTIONS THROUGH DIGITAL CHANNELS

TECHNICAL FIELD

The present disclosure relates generally to electronic forms (e-forms), and more particularly to generating analytics based on interactions with e-forms.

BACKGROUND

With the ubiquitous nature of the Internet, having a successful digital presence has become an indispensable tool for modern businesses and organizations. A digital channel provides perhaps the most easily accessible portal through which users may interact with an entity, through passive viewing or active engagement.

Pursuant to such active engagement, users may interact with electronic forms (e-forms), chat windows, applications, or other aspects of digital channels. For example, an e-form may require that a user type in their name, that the user select a type of payment from a dropdown menu, and the like. To this end, digital channel owners seek to encourage interaction and to minimize premature termination of interactions, i.e., ceasing interactions before the e-form is successfully completed and submitted.

A challenge faced by digital channel owners is that it is difficult to prevent premature termination of interactions through digital channels. For example, users who become frustrated while filling in a digital purchase form may abandon the form, thereby losing a purchase. Thus, it is highly desirable to maximize successful completions of interactions with digital documents.

To increase successful completion rates, entities often seek to modify forms to reduce points of friction (i.e., difficulty or frustration) encountered by users completing the forms. To this end, entities modifying forms must identify these points of friction.

Prior to e-forms, form effectiveness vis-à-vis completion could only be measured via completion rate with respect to metrics such as, for example, the number of forms provided to persons and the number of completed forms returned. Specifically, an entity would not be aware of whether and when a paper form was started and prematurely terminated. As a result, any decisions related to points of friction made based on this information were based on largely incomplete and unspecific information. Further, specific questions that caused friction could not be identified without surveying users directly about the questions.

Existing solutions for identifying challenges in e-form completion utilize data collected based on opening and closing of electronic documents including e-forms. However, these solutions are typically only based on data external to the e-form itself such as, for example, number of e-forms started, number of e-forms completed, number of distinct users interacting with e-forms, durations of time of interactions with e-forms, geographic location of users interacting with e-forms, and the like. Accordingly, these existing solutions do not provide information other than numbers of prematurely terminated interactions and times of such terminations. Thus, they do not show why or when friction points occurred.

Further, existing solutions that provide e-form analytics typically only indicate the time at which a user stopped completing an e-form. At best, some existing solutions can identify particular fields that were being completed when the e-form interaction was terminated, thereby providing more specific information regarding any premature terminations. However, these solutions may introduce new potential sources of error, particularly when abandonment of the interaction is based on a culmination of effort required by multiple fields rather than the user giving up due to a single field.

Additionally, when receiving correspondence, it is beneficial to ignore fraudulent submissions. For example, an identity thief may fraudulently file a tax refund using another person's social security number and other personal information. These fraudulent activities can harm innocent bystanders, and may cause financial or reputational harm to companies or agencies.

Traditionally, solutions for detecting fraud in paper forms included evaluating features of the completed form such as handwriting, syntax, word choice, spelling, and substance of the information. Similarly, detecting fraud during phone conversations may include evaluating speech patterns. However, evaluation of these factors typically required highly subjective determinations of authenticity. For example, the appearance of a person's handwriting may result in different determinations by different employees.

Further, handwriting analysis cannot be performed at all when completed forms use typed text.

Also, digital channels face other challenges that non-digital communications do not. As a particular example, digital channels may be subject to mass fraudulent submissions of e-forms by bots. Specifically, bots may be used to automatically complete survey e-forms, thereby skewing results of the survey and/or allowing a single person to accrue survey completion benefits intended for multiple people.

For e-forms and other digital communications, existing solutions that attempt to detect fraud typically relate to either content of the completed form or external factors regarding form completion. For example, whether identifying information in the completed form is correct, the time taken to complete an entire form, the location (e.g., either geographic or virtual) of the user, a volume of forms coming from a particular location (either geographic or network location), accuracy of submitted information, and other factors may be considered. However, fraud detection based only on such external factors can result in high rates of false positives and false negatives, thereby misidentifying authentic forms as fraudulent or allowing submission of massive numbers of bot-completed e-forms.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for generating analytics based on interactions through digital channels. The method comprises: determining a plurality of interaction sensor signals based on interactions with an electronic form (e-form); clustering at least one set of similar interaction sensor signals of the determined plurality of interaction sensor signals, wherein each set of similar interaction sensor signals includes signals determined based on interactions with the same portion of the e-form; and generating at least one analytic based on each clustered set of interaction sensor signals.

Certain embodiments disclosed herein also include a non-transitory computer readable medium having stored thereon causing a processing circuitry to execute a process, the process comprising: determining a plurality of interaction sensor signals based on interactions with an electronic form (e-form); clustering at least one set of similar interaction sensor signals of the determined plurality of interaction sensor signals, wherein each set of similar interaction sensor signals includes signals determined based on interactions with the same portion of the e-form; and generating at least one analytic based on each clustered set of interaction sensor signals.

Certain embodiments disclosed herein also include a system for generating analytics based on interactions through digital channels. The system comprises: a processing circuitry; and a memory, the memory containing instructions that, when executed by the processing circuitry, configure the system to: determine a plurality of interaction sensor signals based on interactions with an electronic form (e-form); cluster at least one set of similar interaction sensor signals of the determined plurality of interaction sensor signals, wherein each set of similar interaction sensor signals includes signals determined based on interactions with the same portion of the e-form; and generate at least one analytic based on each clustered set of interaction sensor signals.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for providing analytics based on interactions through digital channels. Tracking scripts are embedded into one or more e-forms. The e-forms may be, for example, an electronic document (e.g., a PDF document), a web page, a portion thereof, and the like. User interactions with corresponding portions of the e-forms are tracked via the embedded tracking scripts. The user interactions may include, for example, entering text, mouse movements, pausing during entry, copying, pasting, and the like. Based on the tracked user interactions, interaction sensor signals are determined. Analytics are generated based on the interaction sensor signals. The analytics may indicate portions of the user interactions at which unusual behavior was detected. Accordingly, the analytics may be utilized to, for example, determine friction points (i.e., points of difficulty or struggle that may cause premature terminations), detect fraudulent activity, detect bot activity, prioritize lead generation scoring, develop new customer satisfaction indices, evaluate customer behavioral patterns, and the like.

In various embodiments, interaction sensor signals that are sufficiently similar are clustered. The clustered signals may include, for example, signals related to the same portion of an e-form by multiple users. Interactions may be sufficiently similar when, for example, the interactions are related to the same type of interaction (e.g., all related to mouse movements), measurements of the interactions meet the same threshold (e.g., hovering over a choice for at least 5 seconds), both, and the like. Accordingly, the clusters indicate distributions and frequency of user activities with respect to e-forms and portions thereof.

Based on the clustered signals for a portion of an e-form, insight scores may be generated. The insight scores indicate information about user behaviors, which may be utilized to identify fraudulent activity, non-human activity, discouragement leading to premature terminations of interactions, and the like. Further, subsequent interactions may be compared against clustered signals to identify unusual behaviors, for example to detect fraudulent or bot activity.

The disclosed embodiments provide analytics related to user interactions with portions of e-forms, and specifically allow for identifying unusual behavior based on user interactions tracked in real-time as the e-forms are completed. Further, because interactions with electronic forms may provide more information about the user's experience than the explicitly provided information alone, the analytics may demonstrate implicit behavioral cues that may indicate, for example, whether the user experienced difficulty in completing an interaction, whether and to what degree the information is accurate, whether the user is providing the information fraudulently, and the like.

Figure 1:
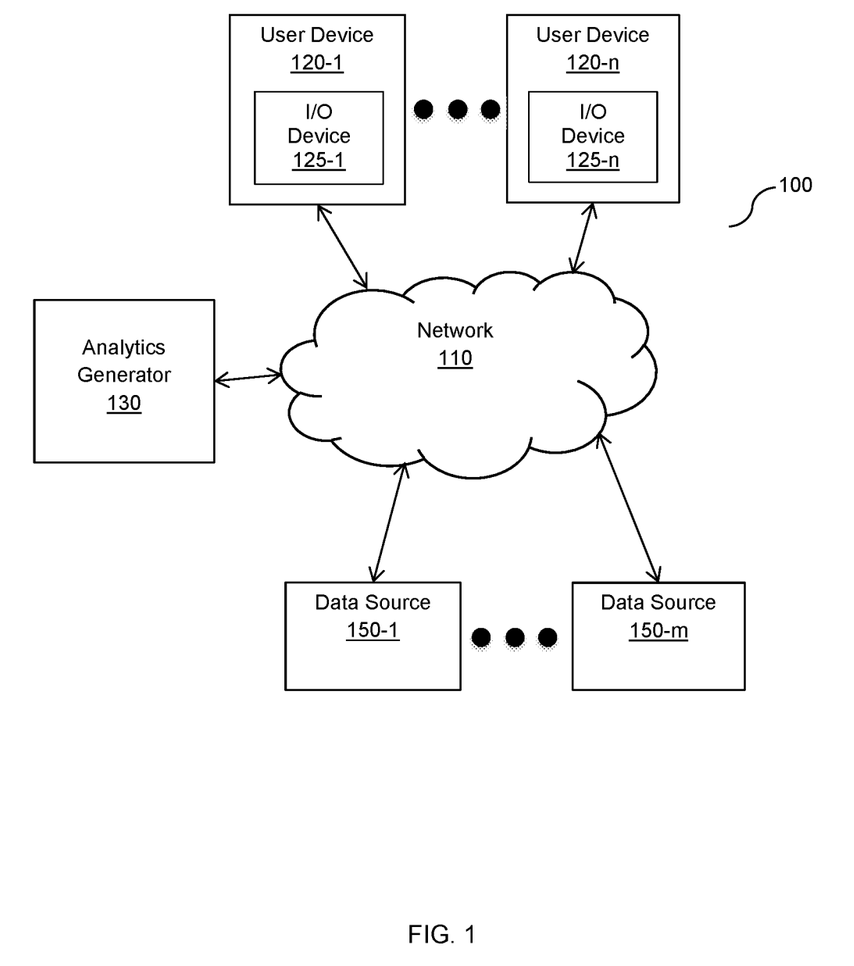
FIG. 1 is a network diagram utilized to describe various disclosed embodiments.

FIG. 1 shows an example network diagram 100 utilized to describe the various disclosed embodiments. Users devices 120-1 through 120-N (hereinafter referred to individually as a user device 120 and collectively as user devices 120, merely for simplicity purposes), an analytics generator 130, and data sources 150-1 through 150-$m$ (hereinafter referred to individually as a data source 150 and collectively as data sources 150, merely for simplicity purposes) communicate via a network 110. The network 110 may be, but is not limited to, a wireless, cellular or wired network, a local area network (LAN), a wide area network (WAN), a metro area network (MAN), the Internet, the worldwide web (WWW), similar networks, and any combination thereof.

Each user device 120 may be, but is not limited to, a personal computer (PC), a personal digital assistant (PDA), a mobile phone, a smart phone, a tablet computer, a wearable computing device, and the like. Each user device 120 is configured to display e-forms and to capture user interactions with the displayed e-forms. To this end, each user device 120 may include one or more input/output (I/O) devices 125, where each I/O device 125 is configured to capture inputs representing user interactions with the e-forms. Each I/O device 125 may be or may include, but is not limited to, a mouse, a keyboard, a camera, a speaker, a touch screen, a motion sensor, an augmented reality (AR) or virtual reality (VR) headset, and the like.

Each data source 150 allows access to at least e-forms (not shown in FIG. 1) to be displayed on the user devices 120. The data sources 150 may include, but are not limited to, servers (e.g., servers hosting websites or electronic documents), databases, and the like. The e-forms include one or more input fields and one or more corresponding control elements. The input fields store user input data indicating user interactions via the control elements. To this end, the control elements may be graphical control elements displayed via a graphical user interface as part of display of the e-form, thereby allowing the user to interact with the control elements by clicking, scrolling, typing, speaking, moving, a combination thereof, and the like. For example, the control elements may include, text entry boxes, dropdown menus, radio buttons, toggles, checkboxes, date pickers, and the like. The e-forms may include, but are not limited to, text documents, PDF documents, hypertext markup language (HTML) documents, and other electronic documents allowing for entry of inputs based on user interactions.

According to various disclosed embodiments, one or more interaction sensor signals are determined based on interactions recorded by tracking scripts included in each e-form sent to the user devices 120. Each interaction sensor signal indicates one or more properties of a user interaction with at least a portion of an e-form and is calculated based on interactions recorded by a corresponding tracking script or portion thereof included in the e-form. Each tracking script, when executed, configures the executing device to record user interactions, also referred to as activities, with at least a portion of the e-form and to send the tracked interactions to the analytics generator 130. The tracking scripts may be pre-embedded in the e-forms or may be embedded in an e-form when a request for the e-form is received.

The tracked user interactions may include, but are not limited to, load, unload, scroll, mousemove, mousedown, mouseup, click, resize, keydown, keypress, keyup, paste, copy, autocomplete, change, mouseleave, mouseenter, activate, deactivate, focus, blur, select, selectstart, submit, error, abort, and the like. Each tracked interaction further includes or is associated with interaction attributes such as, but not limited to, X and Y coordinates of cursors (e.g., for mouse movement-related interactions), keys pressed (e.g., for keyboard-related interactions), positions of scroll bars (e.g., for scroll interactions), window sizes (e.g., for resize interactions), type and location of selected objects or links (e.g., for click events), and the like. The tracked interactions may further be associated with metadata indicating parameters related to the interaction such as, but not limited to, identifiers, time duration of the interaction, time at which the interaction occurred, and the like.

The tracking scripts may further include instructions for tracking data related to the user, session, recording time, form, field, and the like. For example, such scripts may record user identifiers, session identifiers, date of recording, time of recording, form identifiers, field identifiers, field types, record web pages visited within a website, screens visited within an application, cumulative time spent viewing an e-form (i.e., cumulative time spent interacting with different fields, pausing, or both), cumulative time spent visiting a website, links or other elements interacted with, and the like.

As a non-limiting example, a Javascript is embedded into a HTML document including a dropdown menu, and the HTML document is sent to a user device 120-4. The Javascript, when executed by the user device 120-4, causes tracking of interactions by a user of the user device 120-4 with the dropdown menu (e.g., via a mouse or keyboard implemented as an I/O device 125-4) as well as data related to viewing the HTML document. For example, the tracked interactions may include clicks on a mouse, movements of a mouse, keystrokes (e.g., pressing of arrow keys used for navigating selections via the dropdown menu), time spent hovering over dropdown menu choices, time spent on a webpage, whether the HTML document was submitted as a completed form, a combination thereof, and the like.

The tracked interactions and any associated metadata are sent to the analytics generator 130. The analytics generator 130 is configured to determine interaction sensor signals based on the received tracked interactions and associated metadata. The interaction sensor signals may include, but are not limited to, form level signals, textual field signals, selection field signals, a combination thereof, and the like.

The form level signals may include, but are not limited to, the last field interacted with in the form. The textual field signals may include, but are not limited to, an indexed number of the interaction, whether the field is pre-filled, whether a field is auto-completed, an amount of time spent typing, a duration of typing, a time of pause until exiting the field after typing, typing speed, use of deletions, use of pasting, use of enter key, use of tab key, whether a browser is focused on the field (e.g., whether a cursor was placed into the field during interaction with the e-form), and whether a user chose to focus on the field (e.g., via use of a mouse or tab key). The selection field signals may include, but are not limited to, whether the selection was pre-filled (i.e., the selection was made prior to interaction with the field, for example when the user begins viewing the e-form), a number of changes of selection, a first selection, and a last selection.

Based on the determined signals, the analytics generator 130 is configured to generate one or more analytics. To this end, the analytics generator 130 is configured to cluster similar sensor signals. The similar signals may be signals related to the same field, signals of the same type, signals having similar values (e.g., within a threshold value of each other or of a target value), signals meeting one or more common requirements (e.g., exceeding or not exceeding a threshold value), signals determined for e-forms that were prematurely terminated, signals determined for e-forms that were prematurely terminated within a threshold amount of time after interaction with the respective fields, a combination thereof, signals sharing common subject matter (which may be predetermined based on inputs from an e-form owner), and the like. As an example for signals sharing common subject matter, signals for fields asking the same question in different ways or asking related questions may be pre-associated based on selections made by an owner of the e-form. As new signals are determined, they may be grouped with existing clusters having similar signals.

The analytic generator 130 may be further configured to generate insight scores based on the analytics. The insight scores may indicate insights such as, but not limited to, hesitation or decisiveness, friction (i.e., whether the portion is contributing to premature terminations of interactions), unusual behavior (e.g., abnormal speed of interactions as compared to previous interactions by users), and the like, with respect to a field or e-form. In an embodiment, the analytics generator 130 may be configured to identify one or more friction-causing fields (i.e., fields associated with users becoming frustrated and increasing likelihood of premature termination) based on the insight scores. In another embodiment, the analytics generator 130 may be configured to identify one or more instances of fraudulent or non-human (e.g., bot) activity based on the insight scores.

Various example utilizations of analytics generated based on text entry interactions according to the disclosed embodiments are now described. In the following examples, analytics are generated by clustering signals related to time of entry of textual inputs. It should be noted that these examples are merely demonstrative, and that other signals may be equally utilized, other analytics may be generated, or both.

As a first example, an e-form to be completed when applying for an insurance plan includes a field requiring input of an address of the user. Signals including a time of entry less than a threshold that were prematurely terminated within 5 seconds of interaction with the field are clustered and, based on the clustered signals, a decisiveness score is generated. The decisiveness score indicates that users entering their addresses were highly decisive. Based on the decisiveness score, the field is identified as a friction-causing field. For example, the address entry box may have an unexpected formatting requirement that leads users to confidently enter accurate information that is rejected and, thus, becoming frustrated and stopped completing the e-form shortly after.

As a second example, an e-form to be completed when applying for a shopper membership plan includes fields requiring textual inputs of various information. Signals including a time of entry greater than a threshold are clustered and, based on the clustered signals, a decisiveness score is generated for each field. The decisiveness score indicates that users entering their addresses were not decisive and stopped completing the form shortly after one of the fields. Based on the decisiveness scores, one or more of the fields may be identified as friction-causing fields. For example, fields requesting seemingly unrelated information may cause users to hesitate, thereby leading to abandonment.

As a third example, a customer survey e-form includes fields associated with related questions (for example, asking whether the customer ordered online and whether the customer ordered over the phone). Signals including a time of entry greater than a threshold or less than a threshold for each field are clustered and, based on the clustered signals, a decisiveness score is generated for each field. The decisiveness score indicates that users entering text for one field did so decisively, but that users entering text for the other field did not. Based on the decisiveness scores, one of the fields is identified as a friction-causing field. For example, the phrasing of a question associated with one field may be more intuitive, thereby leading to less hesitation when users answer the question.

As a fourth example, an e-form for a subscription renewal includes fields requiring textual inputs of various information. Signals including a time of entry greater than a threshold are clustered and, based on the clustered signals, a decisiveness score is generated for each field. The decisiveness score indicates that users entering text into all of the fields after the fifth were indecisive. Based on the decisiveness scores, all of the fields after the fifth field may be identified as friction-causing fields. For example, after a certain number of questions, even users that complete forms may become frustrated with excessive requirements for text entry.

It should be noted that only a single I/O device 125 is illustrated for each user device 120 in FIG. 1 merely for simplicity purposes, and that multiple I/O devices may be implemented in each user device 120.

It should also be noted that different tracking scripts may be included in different e-forms, different interaction signals may be determined for different e-forms, or both. Which tracking scripts to utilize and which signals to determine for a given e-form may be predetermined, for example, based on selections made by an owner of the e-form or based on the type of form.

Figure 2:
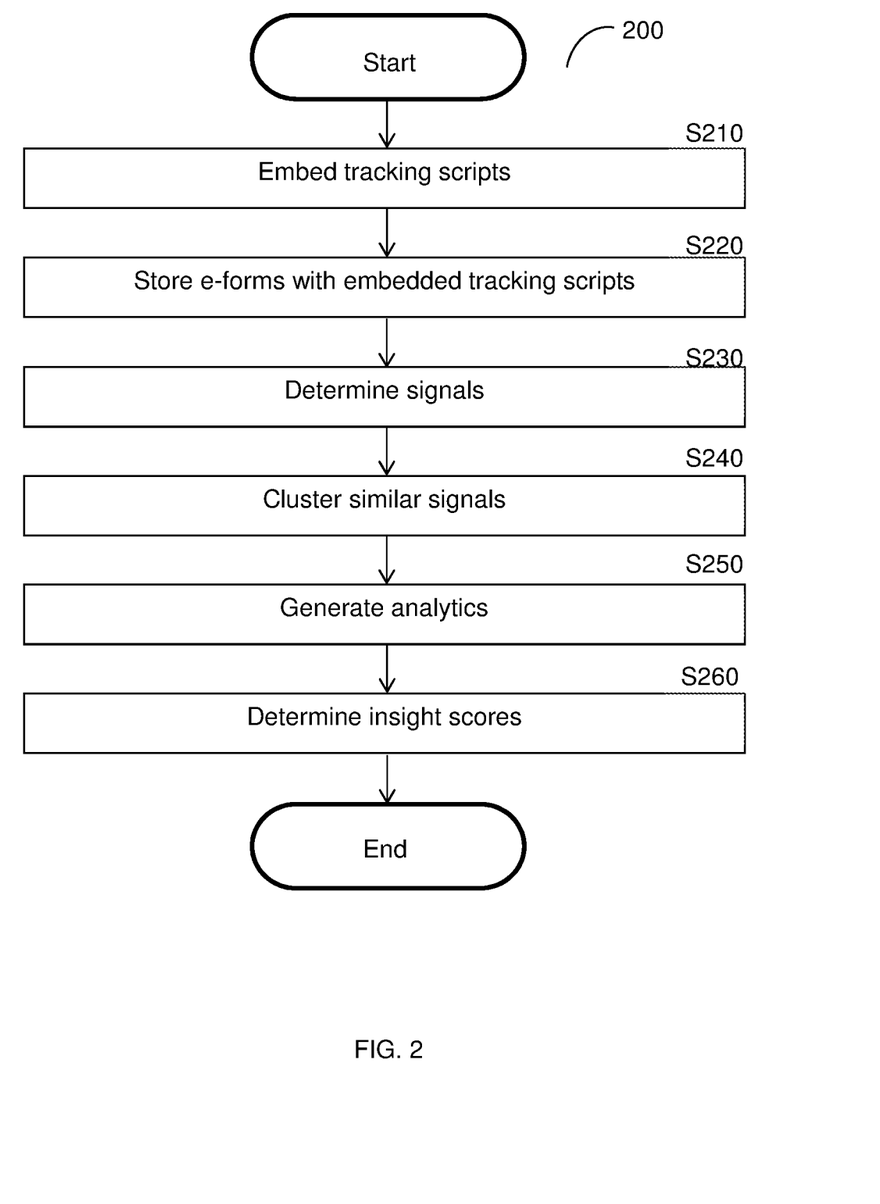
FIG. 2 is a flowchart illustrating a method for providing analytics based on interactions through digital channels according to an embodiment.

FIG. 2 shows an example flowchart 200 illustrating a method for providing analytics based on interactions through a digital channel according to an embodiment. In an embodiment, the method is performed by the analytics generator 130, FIG. 1.

At S210, a tracking script is embedded into each of one or more e-forms. Each tracking script includes instructions that, when executed by a user device, configures the user device to track one or more interactions with respect to at least a portion of an e-form. Each portion of an e-form may be, but is not limited to, a field. For example, an e-form may be an HTML form, such that data may be collected and recorded based on interactions with fields embedded in corresponding HTML field elements such as a text input field, a radio button, or a drop-down menu.

At S220, the e-forms having embedded tracking scripts are sent for storage in one or more data sources (e.g., the data sources 150, FIG. 1). Users may access electronic documents stored in the data sources, for example over the Internet. It should be noted that, in some implementations, S210 and S220 may be optional, for example when the e-forms are created including tracking scripts or otherwise pre-embedded with tracking scripts.

At S230, interactions with the e-forms are received and interaction sensor signals are determined based on interactions recorded by user devices executing the embedded tracking scripts. The interactions for each e-form are recorded in response to inputs to a user device displaying the e-form when the embedded tracking script has been executed and may be received from the user devices continuously (e.g., as interactions with each e-form is terminated) or periodically. The interaction sensor signals may include field-specific interactions such as, but are not limited to, keys pressed, use of shortcuts, clicks, positions and movements of cursors, and the like. The interaction sensor signals may further be associated with metadata of the interaction as well as data related to the user, session, recording time, form, field, and the like.

At S240, similar interaction sensor signals are clustered. The clustering of similar interaction sensor signals allows for deriving meaningful insights for the interactions. The similar interaction sensor signals are related to the same type of interaction (e.g., text entry, drop down menu selection, radio button selection, etc.) with the same portion of the e-form (e.g., the same field, buttons, etc.), and may further include one or more common characteristics such as, but not limited to, similar values (e.g., within a predetermined threshold value or proportion of each other), same selection or button, meeting the same predetermined condition (e.g., having values above or below a predetermined threshold), and the like.

At S250, analytics are generated based on the clustered signals. The analytics represent characteristics of the collective interactions such as, but not limited to, whether the e-form was viewed, a number of fields interacted with, a first field interacted with, a last field interacted with, an average number of uses of auto-complete, a ratio of pre-filled fields, an average time spent typing, an average duration of text entry, an average time of pause before termination, an average typing speed, a deletion ratio, an average number of times a field was revisited, a ratio of use of "paste" function (rather than typing), an enter by Tab ratio, an enter ratio, a minimum number of changed choices, a maximum number of changed choices, an average number of changed choices, At optional S260, one or more insight scores may be determined based on the clustered signals. The insight scores demonstrate insights related to user interactions with each field as determined based on the analytics. Example insight scores may include, but are not limited to, friction scores (i.e., scores indicating a degree of difficulty experienced by users), impact on motivation to share (IMS) scores, behavioral quality scores, cues of deception scores, technological savviness scores, hesitation scores, decisiveness scores, trust scores, trustworthiness scores, frustration scores, carefulness scores, search scores, login scores, emotion scores, sentiment scores, and confusion scores. As a non-limiting example, long average pause times coupled with terminations shortly thereafter may result in a high friction score for a field, suggesting that users encountering that field become frustrated and quit. As another non-limiting example, short average pause and total typing times may result in high trustworthiness scores, suggesting that users interacting with the field were providing honest and accurate information.

Figure 3:
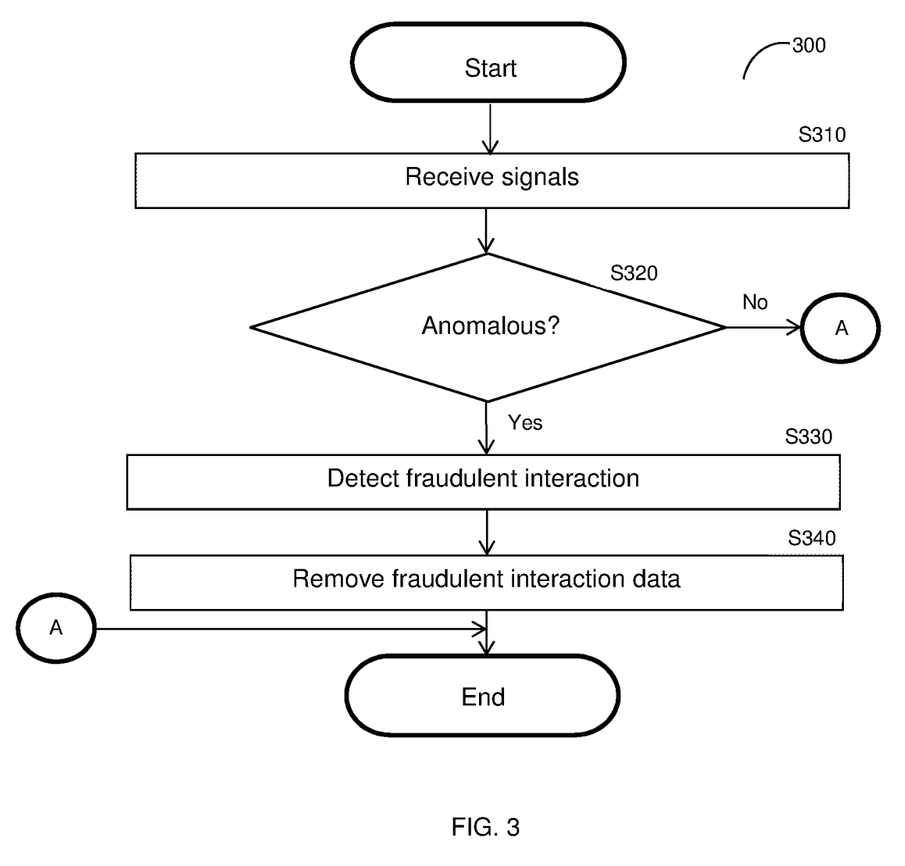
FIG. 3 is a flowchart illustrating a method for detecting fraudulent activity according to an embodiment.

FIG. 3 is an example flowchart 300 illustrating a method for detecting fraudulent activity based on interactions through digital channels according to an embodiment.

At S310, interaction sensor signals are received or determined. The received interaction sensor signals may be determined by, for example, the analytics generator 130, FIG. 1. The interaction sensor signals are based on recorded interactions from a tracking script embedded in an e-form as described herein above, and may be received or determined in real-time or otherwise prior to submission of the e-form. Accordingly, fraudulently completed e-forms may be identified and removed prior to submission.

At S320, the interaction sensor signals are compared to analytics generated based on one or more previously clustered sets of interaction sensor signals. The analytics may be generated as described herein above with respect to FIG. 2 for prior user interactions with e-forms. Based on the comparison, it is determined if the interaction sensor signals are anomalous. If so, execution continues with S330; otherwise, execution terminates.

An interaction sensor signal may be anomalous if, for example, the interaction sensor signal differs from a respective analytic (e.g., an analytic related to the same type of signal) above a predetermined threshold. For example, if an average time spent typing in a field is 5 seconds and a signal determined for an interaction has a time spent typing of 1 second, the signal may be determined to be anomalous.

At S330, when it is determined that one or more interaction sensor signals are anomalous, a fraudulent interaction is detected. The fraudulent interaction may be identified with respect to the e-form in which the anomalous interaction was recorded. The fraudulent activity detection may indicate, for example, that a user is submitting false or stolen information, that the user is a bot, and the like.

At optional S340, data related to the detected fraudulent activity may be removed prior to submission. The removal may include, for example, deleting interaction sensor signals for fraudulent interactions such that the fraudulent interaction sensor signals do not affect further analysis of the e-form, sending a notification indicating the fraudulent interactions, generating a fraudulent activity alert, or a combination thereof. Removing data related to fraudulent interactions prevents fraudulent activities from being considered. For example, fraudulent responses to surveys may be ignored such that they do not affect the overall results of the survey. As another example, fraudulent submissions of applications may be ignored so as to reduce time and resources for processing invalid applications.

It should be noted that FIG. 3 is illustrated with execution terminating after S340 merely for simplicity purposes, and that execution may continue with S310 after S340 without departing from the scope of the disclosure. Specifically, execution may repeat to continuously or repeatedly detect potential fraudulent activity.

Figure 4:
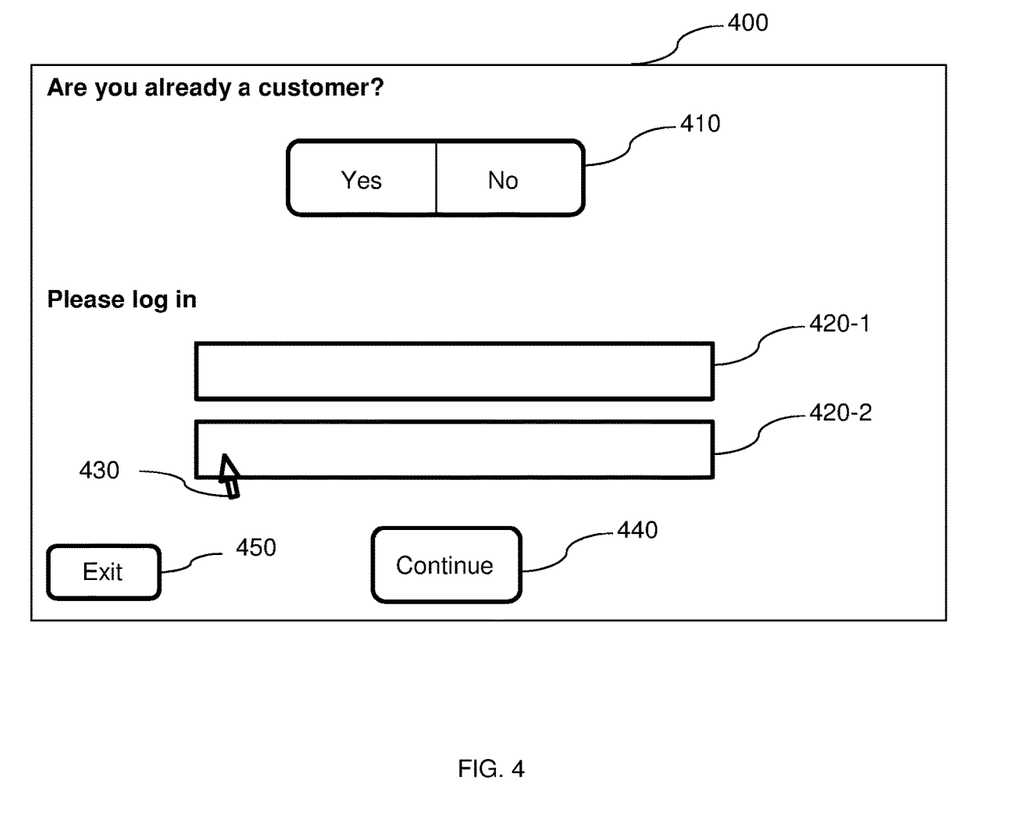
FIG. 4 is a screenshot of a graphical user interface of an e-form that may be utilized in accordance with various disclosed embodiments.

FIG. 4 is an example screenshot 400 of an e-form utilized to describe various disclosed embodiments. The screenshot 400 illustrates a toggles button 410, text entry boxes 420-1 and 420-2 (hereinafter referred to individually as a text entry box 420 and collectively as text entry boxes 420, merely for simplicity purposes), a mouse cursor 430, a completion button 440, and an exit button 450.

The toggles button 410 may be interacted with by, for example, moving the mouse cursor 430 to either the "Yes" toggle or the "No" toggle and clicking on the respective option. The text entry boxes 420 allow for inputting login credentials via typing, and may have interactions initiated by, for example, moving the mouse cursor 430 to each text entry box or pressing a "Tab" key (not shown) to navigate fields.

In the screenshot 400 shown in FIG. 4, the mouse cursor 430 is shown as hovering over the text entry box 420-2. With respect to a portion of a tracking script related to recording interactions with the text entry box 420-2, the movement of the mouse over the text entry box 420-2, the time spent hovering over the text entry box-420-2, and any clicking while hovering over the text entry box 420-2 may be recorded as interactions with the corresponding field.

The continue button 440 and the exit button 450 may be interacted with to terminate interactions with the e-form. In an example implementation, interacting with the continue button 440 by clicking indicates a desire to submit a completed form, while interacting with the exit button 450 by clicking indicates a desire to prematurely terminate interactions with the e-form. Thus, analytics related to premature termination may be generated based on clustered signals related to the exit button 450 and at least one other field.

Figure 5:
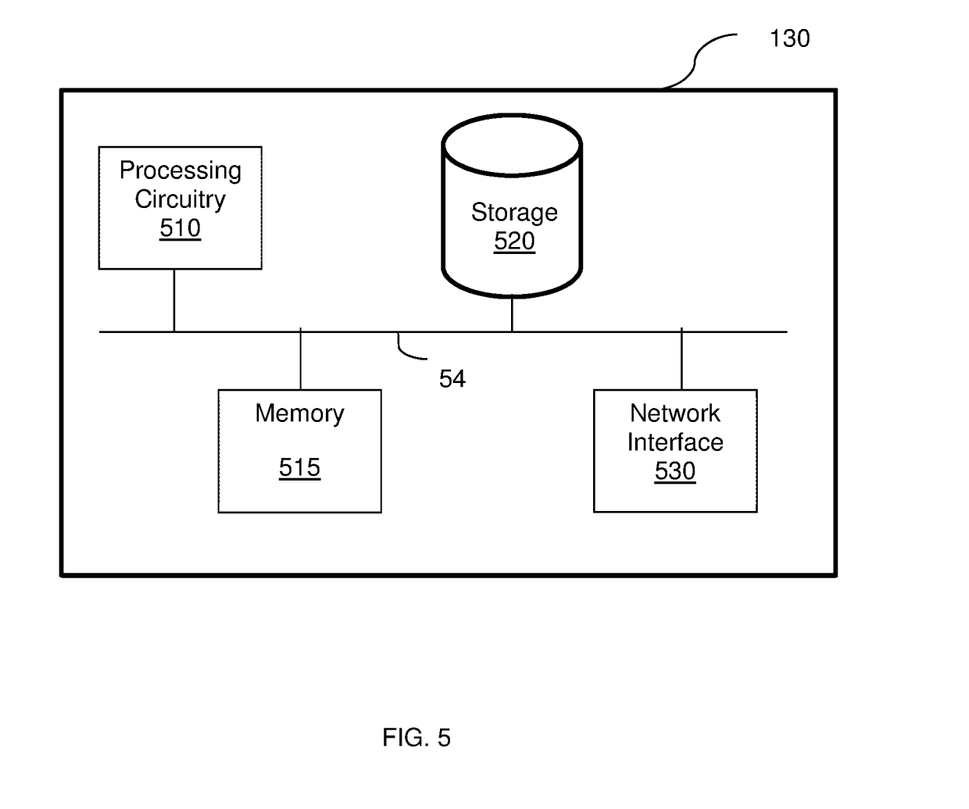
FIG. 5 is a schematic diagram illustrating a digital channel analytics generator according to an embodiment.

FIG. 5 is an example schematic diagram of an analytics generator 130 according to an embodiment. The analytics generator 130 includes a processing circuitry 510 coupled to a memory 515, a storage 520, and a network interface 530. In another embodiment, the components of the analytics generator 130 may be communicatively connected via a bus 54.

The processing circuitry 510 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 515 may be volatile (e.g., RAM, etc.), non-volatile (e.g., ROM, flash memory, etc.), or a combination thereof. In one configuration, computer readable instructions to implement one or more embodiments disclosed herein may be stored in the storage 520.

In another embodiment, the memory 515 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 510, configure the processing circuitry 510 to perform the various processes described herein.

The storage 520 may be magnetic storage, optical storage, and the like, and may be realized, for example, as flash memory or other memory technology, CD-ROM, Digital Versatile Disks (DVDs), or any other medium which can be used to store the desired information.

The network interface 530 allows the analytics generator 130 to communicate with the user devices 120, the data sources 150, or both, for the purpose of, for example, retrieving e-forms, sending e-forms with embedded tracking scripts, receiving recorded user interaction data, and the like.

It should be understood that the embodiments described herein are not limited to the specific architecture illustrated in FIG. 5, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method, comprising:
   determining, by processing circuitry, a plurality of interaction sensor signals based on interactions by a plurality of users with an electronic form (e-form), each of the plurality of users interacting with the e-form at a particular user device having a user interface and at least one of the plurality of interaction sensor signals being from each particular user device, each particular user device including a plurality of input/output (I/O) devices, wherein a particular input/output device from the plurality of I/O devices comprises a mouse, the mouse is configured to capture inputs representing user interactions with the e-form, the user interactions corresponding to at least interaction sensor signal from the plurality of interaction sensor signals;
   identifying by the processing circuitry, among the plurality of interaction sensor signals, a set of second interaction sensor signals indicating that the e-form was prematurely terminated, wherein the set of second interaction sensor signals comprises at least a particular interaction sensor signal corresponding to clicking of the mouse on an exit button of the e-form;
   determining, by the processing circuitry, that the identified set of second interaction sensor signals occurred within a threshold amount of time after an interaction with a respective field of the e-form, wherein the respective field of the e-form comprises particular text entry box of the e-form;
   clustering, by the processing circuitry, a first set of similar interaction sensor signals of the determined plurality of interaction sensor signals, the first set of similar interaction sensor signals including signals determined based on interactions of the plurality of users with a same portion of the e-form, the first set of similar interaction sensor signals being based at least in part on a same type of interaction sensor signal being within a predetermined threshold value of each interaction sensor signal from the first set of similar interaction sensor signals, wherein the first set of similar interaction sensor signals comprises at least a first interaction sensor signal corresponding to a movement of a mouse cursor over the particular text entry box of the e-form and a second interaction sensor signal corresponding to a time of the mouse cursor hovering over the particular text entry box of the e-form;

clustering, by the processing circuitry, a second set of similar interaction sensor signals based on the identified set of second interaction sensor signals that were determined to be within the threshold amount of time after the interaction with the respective field of the e-form;

generating, by the processing circuitry, at least one analytic based on the first set of similar interaction sensor signals and the identified set of second interaction sensor signals; and providing, by the processing circuitry, a respective value of the at least one analytic to a digital channel owner, the respective value being utilized to identify a portion of the e-form to modify a point of friction to increase a successful completion rate of the e-form by other users interacting with the e-form.

2. The method of claim 1, wherein the plurality of interaction sensor signals is a plurality of first interaction signals determined based on interactions with the e-form via the particular user device, the same type of interaction sensor signal further comprises a first set of particular interaction sensor signals determined for e-forms that were prematurely terminated, a second set of particular interaction sensor signals associated with a same selection or a same button, or a third set of particular interaction sensor signals with values above or below a predetermined threshold, each of the e-forms that was prematurely terminated corresponding to a particular e-form in which interactions were ceased prior to the particular e-form being successfully completed and submitted, and the set of second interaction sensor signals indicating that the e-form was prematurely terminated includes a signal indicating a time of entry of a particular field of the e-form that was less than a threshold value and the time of entry was prematurely terminated within a particular period of time after interaction with the particular field.

3. The method of claim 1, further comprising:
determining, based on the at least one analytic, at least one friction point in the interactions with the e-form.

4. The method of claim 1, wherein a tracking script is included in the e-form, the tracking script, when executed at the particular user device, configures the particular user device to record interactions with the e-form, the method further comprising:

receiving, from the particular user device, the interactions with the e-form when the e-form has been displayed on the user interface of the particular user device.

5. The method of claim 4, further comprising:
embedding the tracking script in the e-form; and
storing the e-form including the embedded tracking script in at least one data source that is accessible to the particular user device.

6. The method of claim 1, wherein the signals of each set of similar interaction sensor signals are determined based on interactions sharing a common type of interaction.

7. The method of claim 1, wherein the signals of each set of similar interaction sensor signals share at least one common characteristic with respect to a value representing the interaction.

8. A non-transitory computer readable medium having stored thereon instructions for causing a processing circuitry to execute a process, the process comprising:

determining, by the processing circuitry, a plurality of interaction sensor signals based on interactions by a plurality of users with an electronic form (e-form), each of the plurality of users interacting with the e-form at a particular user device having a user interface and at least one of the plurality of interaction sensor signals being from each particular user device, each particular user device including a plurality of input/output (I/O) devices, wherein a particular input/output device from the plurality of I/O devices comprises a mouse, the mouse is configured to capture inputs representing user interactions with the e-form, the user interactions corresponding to at least interaction sensor signal from the plurality of interaction sensor signals;

identifying by the processing circuitry, among the plurality of interaction sensor signals, a set of second interaction sensor signals indicating that the c-form was prematurely terminated, wherein the set of second interaction sensor signals comprises at least a particular interaction sensor signal corresponding to clicking of the mouse on an exit button of the e-form;

determining, by the processing circuitry, that the identified set of second interaction sensor signals occurred within a threshold amount of time after an interaction with a respective field of the e-form, wherein the respective field of the e-form comprises particular text entry box of the e-form;

clustering, by the processing circuitry, a first set of similar interaction sensor signals of the determined plurality of interaction sensor signals, the first set of similar interaction sensor signals including signals determined based on interactions of the plurality of users with a same portion of the e-form, the first set of similar interaction sensor signals being based at least in part on a same type of interaction sensor signal being within a predetermined threshold value of each interaction sensor signal from the first set of similar interaction sensor signals, wherein the first set of similar interaction sensor signals comprises at least a first interaction sensor signal corresponding to a movement of a mouse cursor over the particular text entry box of the c-form and a second interaction sensor signal corresponding to a time of the mouse cursor hovering over the particular text entry box of the e-form;

clustering, by the processing circuitry, a second set of similar interaction sensor signals based on the identified set of second interaction sensor signals that were determined to be within the threshold amount of time after the interaction with the respective field of the e-form;

generating, by the processing circuitry, at least one analytic based on the first set of similar interaction sensor signals and the identified set of second interaction sensor signals; and providing, by the processing circuitry, a respective value of the at least one analytic to a digital channel owner, the respective value being utilized to identify a portion of the e-form to modify a point of friction to increase a successful completion rate of the e-form by other users interacting with the e-form.

9. A system, comprising:

a processing circuitry; and a memory, the memory containing instructions that, when executed by the processing circuitry, cause the system to perform operations comprising:

determining a plurality of interaction sensor signals based on interactions by a plurality of users with an electronic form (e-form), each of the plurality of users interacting with the e-form at a user device having a user interface and at least one of the plurality of interaction sensor signals being from each particular user device, each particular user device including a plurality of input/output (I/O) devices, wherein a particular input/output device from the plurality of I/O devices comprises a mouse, the mouse is configured to capture inputs representing user interactions with the e-form, the user interactions corresponding to at least interaction sensor signal from the plurality of interaction sensor signals;

identifying, among the plurality of interaction sensor signals, a set of second interaction sensor signals indicating that the e-form was prematurely terminated, wherein the set of second interaction sensor signals comprises at least a particular interaction sensor signal corresponding to clicking of the mouse on an exit button of the e-form;

determining that the identified set of second interaction sensor signals occurred within a threshold amount of time after an interaction with a respective field of the e-form, wherein the respective field of the e-form comprises particular text entry box of the e-form;

clustering a first set of similar interaction sensor signals of the determined plurality of interaction sensor signals, the first set of similar interaction sensor signals including signals determined based on interactions of the plurality of users with a same portion of the e-form, the first set of similar interaction sensor signals being based at least in part on a same type of interaction sensor signal being within a predetermined threshold value of each interaction sensor signal from the first set of similar interaction sensor signals, wherein the first set of similar interaction sensor signals comprises at least a first interaction sensor signal corresponding to a movement of a mouse cursor over the particular text entry box of the e-form and a second interaction sensor signal corresponding to a time of the mouse cursor hovering over the particular text entry box of the e-form;

generating at least one analytic based on the first set of similar interaction sensor signals and the identified set of particular interaction sensor signals; and providing a respective value of the at least one analytic to a digital channel owner, the respective value being utilized to identify a portion of the e-form to modify a point of friction to increase a successful completion rate of the e-form by other users interacting with the e-form.

10. The system of claim 9, wherein the operations further comprise:

detecting a fraudulent interaction when a second particular interaction sensor signal of plurality of interaction sensor signals is anomalous as compared to a respective value of the at least one analytic, and the second particular interaction sensor signal is anomalous when a respective value of the at least one analytic is different than an average value associated with the second particular interaction sensor signal above a predetermined threshold.

11. The system of claim 9, wherein the operations further comprise:

determining, based on the at least one analytic, at least one friction point in the interactions with the e-form.

12. The system of claim 9, wherein a tracking script is included in the e-form, the tracking script, when executed at the particular user device, configures the particular user device to record interactions with the e-form, wherein the operations further comprise:

receiving, from the particular user device, the interactions with the e-form when the e-form has been displayed on the user interface of the particular user device.

13. The system of claim 12, wherein the operations further comprise:

embedding the tracking script in the e-form; and storing the e-form including the embedded tracking script in at least one data source that is accessible to the particular user device.

14. The system of claim 9, wherein the signals of each set of similar interaction sensor signals are determined based on interactions sharing a common type of interaction.

15. The system of claim 9, wherein the signals of each set of similar interaction sensor signals share at least one common characteristic with respect to a value representing the interaction.

16. The method of claim 1, further comprising:

comparing a value of a third interaction sensor signal to a respective value of the at least one analytic, wherein the third interaction sensor signal is determined based on interactions with the e-form by a second user device;

detecting, based on the comparing, a fraudulent interaction with the e-form by the second user device; and in response to detecting the fraudulent interaction, ignoring, by the processing circuitry, a submission of the e-form by the second user device, the ignoring causing a reduction of time and resources utilized by a computing system for processing invalid applications based on the e-form.

17. The method of claim 16, wherein the fraudulent interaction is detected when third interaction sensor signal is anomalous as compared to a respective value of the at least one analytic, and the third interaction sensor signal is anomalous when a respective value of the at least one analytic is different than an average value associated with the third interaction sensor signal above a predetermined threshold.

* * * * *

UNITED STATES PATENT AND TRADEMARK OFFICE
CERTIFICATE OF CORRECTION

| | |
|---|---|
| PATENT NO. | : 11,694,293 B2 |
| APPLICATION NO. | : 16/023928 |
| DATED | : July 4, 2023 |
| INVENTOR(S) | : Agasi et al. |

It is certified that error appears in the above-identified patent and that said Letters Patent is hereby corrected as shown below:

On the Title Page

In item (73), in "Assignee", in Column 1, Line 1, delete "LTD," and insert --LTD.,-- therefor In the Claims In Column 14, Line 24, in Claim 8, delete "c-form" and insert --e-form-- therefor In Column 14, Line 48, in Claim 8, delete "c-form" and insert --e-form-- therefor In Column 15, Line 50, in Claim 9, after "identified", insert --second--

Signed and Sealed this
First Day of October, 2024

Katherine Kelly Vidal
*Director of the United States Patent and Trademark Office*